(12) United States Patent
Chen et al.

(10) Patent No.: US 11,569,740 B2
(45) Date of Patent: Jan. 31, 2023

(54) BOOST CONVERTER WITH FAST TRANSIENT RESPONSE

(71) Applicants: NCKU Research and Development Foundation, Tainan (TW); Himax Technologies Limited, Tainan (TW)

(72) Inventors: Chun-Yen Chen, Tainan (TW); Chien-Hung Tsai, Tainan (TW); Chia-Hsuan Huang, Tainan (TW); Teng-Kuei Wu, Tainan (TW)

(73) Assignees: NCKU Research and Development Foundation, Tainan (TW); Himax Technologies Limited, Tainan (TW)

( * ) Notice: Subject to any disclaimer, the term of this patent is extended or adjusted under 35 U.S.C. 154(b) by 135 days.

(21) Appl. No.: 17/204,162

(22) Filed: Mar. 17, 2021

(65) Prior Publication Data
US 2022/0302833 A1 Sep. 22, 2022

(51) Int. Cl.
*H02M 3/156* (2006.01)

(52) U.S. Cl.
CPC .................................. *H02M 3/156* (2013.01)

(58) Field of Classification Search
None
See application file for complete search history.

(56) References Cited

U.S. PATENT DOCUMENTS

| | | | | |
|---|---|---|---|---|
| 8,493,047 B2 * | 7/2013 | Zhang | ................ | H02M 3/1588 |
| | | | | 323/284 |
| 9,178,431 B2 * | 11/2015 | Chen | .................... | H02M 1/4225 |
| 9,882,479 B2 * | 1/2018 | Mathe | ................... | H02M 3/158 |
| 10,085,313 B2 * | 9/2018 | Yoo | ........................ | H05B 45/375 |
| 10,211,730 B2 * | 2/2019 | Toyama | ................ | H02M 3/158 |
| 10,892,683 B2 * | 1/2021 | Nam | ..................... | H02M 3/158 |

* cited by examiner

*Primary Examiner* — Jeffrey A Gblende
(74) *Attorney, Agent, or Firm* — Donald E. Stout; Stout, Uxa & Buyan, LLP

(57) ABSTRACT

A boost converter includes an inductor and a diode electrically connected in series between an input voltage and an output voltage; a transistor electrically coupled to an interconnected node of the inductor and the diode; and a controller that controls switching of the transistor according to a transient mode and an estimated load current. The output voltage in a light-to-heavy load transient mode has at least one first valley point with a value of a transient voltage threshold, followed by at least one second valley point with a value higher than the first valley point, before exiting the light-to-heavy load transient mode.

11 Claims, 5 Drawing Sheets

BOOST CONVERTER WITH FAST TRANSIENT RESPONSE

BACKGROUND OF THE INVENTION

1. Field of the Invention

The present invention generally relates to a boost converter, and more particularly to a boost converter with fast transient response.

2. Description of Related Art

A boost converter is a DC-to-DC power converter that steps up voltage from its input to its output. The boost converter is a class of switched-mode power supply (SMPS).

The boost converter may be adapted to a driver for a backlight panel (for example, a mini-LED backlight panel). As load transient in the mini-LED backlight panel changes rapidly, a boost converter with fast transient response is greatly demanded.

A boost converter with fast transient response is disclosed by Peretz et al. in "Hardware-Efficient Programmable-Deviation Controller for Indirect Energy Transfer DC-DC Converters," IEEE Transactions on Power Electronics, vol. 30, no. 6, pp. 3376-3388, June 2015, the entire contents of which are hereby incorporated by reference. Peretz's boost converter, however, adopts a lookup table that stores fixed coefficients for controlling load transient, thereby resulting in oscillation which slows down the load transient.

A need has thus arisen to propose a novel scheme for effectively controlling load transient in the boost converter.

SUMMARY OF THE INVENTION

In view of the foregoing, it is an object of the embodiment of the present invention to provide a boost converter with fast transient response capable of preventing unwanted oscillation and substantially speeding up light-to-heavy load transient.

According to one embodiment, a boost converter includes an inductor, a diode, a transistor and a controller. The inductor and the diode are electrically connected in series between an input voltage and an output voltage. The transistor is electrically coupled to an interconnected node of the inductor and the diode. The controller controls switching of the transistor according to a transient mode and an estimated load current. The output voltage in a light-to-heavy load transient mode has at least one first valley point with a value of a transient voltage threshold, followed by at least one second valley point with a value higher than the first valley point, before exiting the light-to-heavy load transient mode.

DETAILED DESCRIPTION OF THE INVENTION

Figure 1:
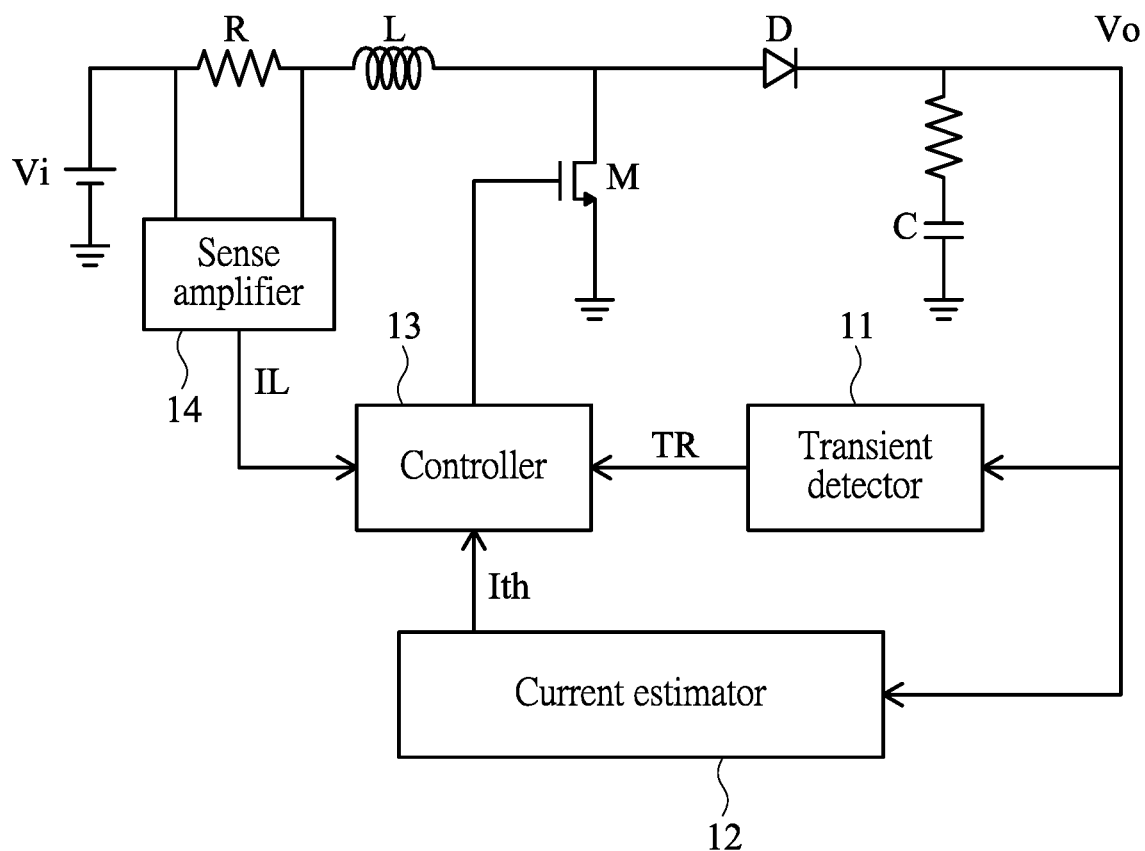
FIG. 1 shows a block diagram illustrating a boost converter with fast transient response according to one embodiment of the present invention.

FIG. 1 shows a block diagram illustrating a boost converter 100 with fast transient response according to one embodiment of the present invention. The boost converter 100 is configured to step up voltage from an input voltage Vi to an output voltage Vo. Only transient mode loop is shown while steady mode loop is omitted for brevity.

The boost converter 100 may include an inductor L (as an energy storage element) and a diode D electrically connected in series between the input voltage Vi and the output voltage Vo. The boost converter 100 may include a transistor M electrically connected between an interconnected node (of the inductor L and the diode D) and ground. The boost converter 100 may include a capacitor C (as another energy storage element) electrically connected between the output voltage Vo and the ground.

In the embodiment, the boost converter 100 may include a transient detector 11 configured to detect a transient mode TR by comparing the output voltage Vo with a steady state window bounded by an upper bound VH and a lower bound VL. Specifically, a transient mode TR is detected when the output voltage Vo is not within the steady state window.

The boost converter 100 of the embodiment may include a current estimator 12 configured to generate an estimated (steady) load current Ith according to change in the output voltage Vo. For example, the estimated load current Ith may be generated according to the (falling) slope of the output voltage Vo in the beginning period of the light-to-heavy load transient mode. It is appreciated that, in one embodiment, the transient detector 11 and the current estimator 12 may include an analog-to-digital converter (not shown) configured to converter an analog output voltage Vo to a digital equivalent, according to which the transient mode TR and the estimated load current Ith may be obtained in a digital manner.

The boost converter 100 may include a (digital) controller 13 configured to control switching of the transistor M according to the detected transient mode TR (from the transient detector 11) and the estimated load current Ith (from the current estimator 12).

Figure 2A:
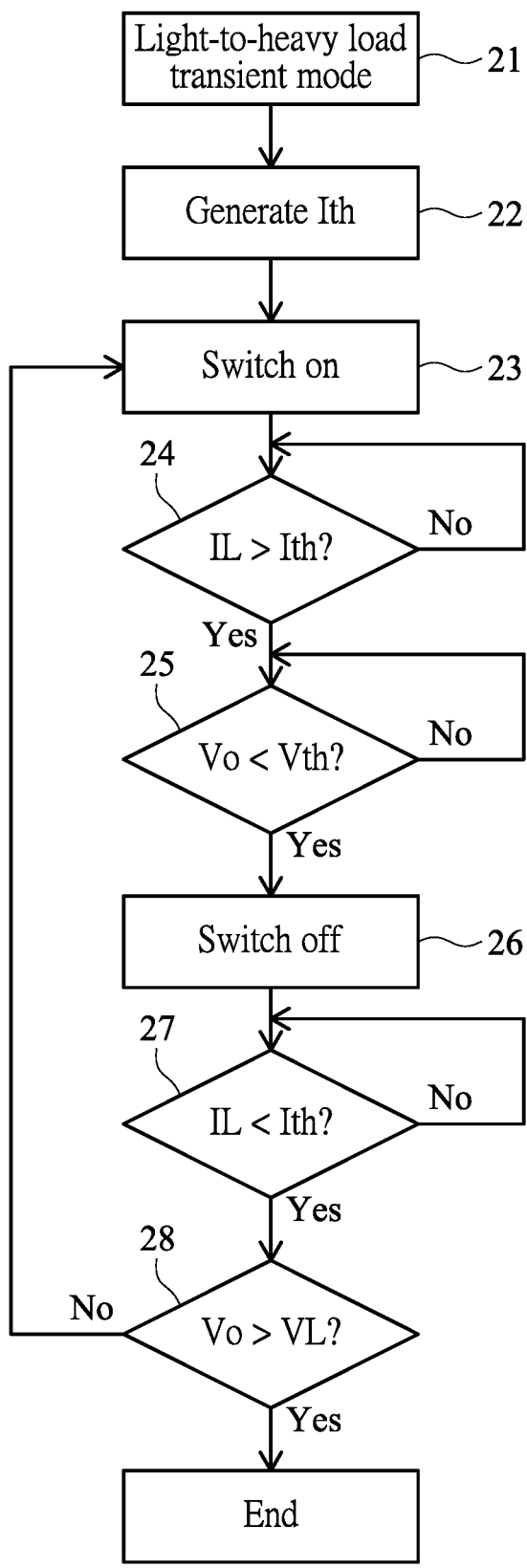
FIG. 2A shows a flow diagram illustrating a light-to-heavy load transient mode of the boost converter according to one embodiment of the present invention.
Figure 2B:
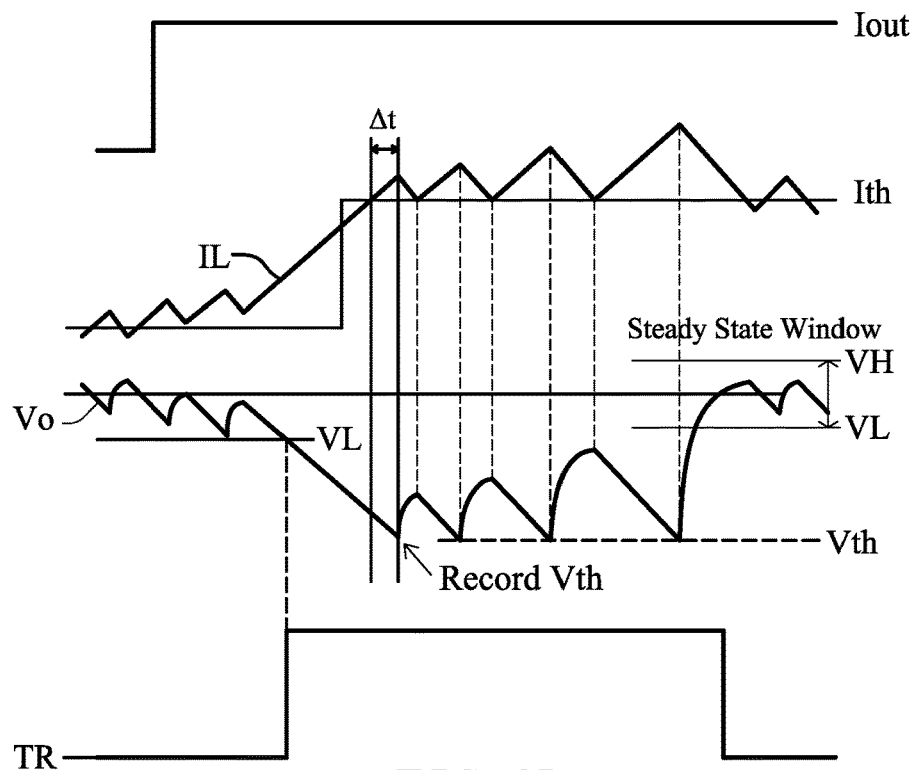
FIG. 2B shows exemplary waveforms of pertinent signals in the light-to-heavy load transient mode.

FIG. 2A shows a flow diagram illustrating a light-to-heavy load transient mode of the boost converter 100 according to one embodiment of the present invention, and FIG. 2B shows exemplary waveforms of pertinent signals in the light-to-heavy load transient mode.

Specifically, the boost converter 100 enters the light-to-heavy load transient mode (step 21) when the output voltage Vo is lower than the lower bound VL (of the steady state window) as detected by the transient detector 11. In step 22, the current estimator 12 generates an estimated load current Ith according to change in the output voltage Vo. Next, in step 23, the controller 13 fully switches on the transistor M, thereby resulting in rising inductor current IL and falling output voltage Vo.

According to one aspect of the embodiment, when the inductor current IL is greater than the estimated load current Ith (step 24), the output voltage Vo is recorded as a transient voltage threshold Vth after a predetermined time Δt lapses. It is appreciated that the inductor current IL may be obtained by a sense amplifier 14 that measures voltage across a resistor R (FIG. 1) that is connected in series with the inductor L. When the output voltage Vo is lower than the transient voltage threshold Vth (step 25), the controller 13 fully switches off the transistor M (step 26), thereby resulting in falling inductor current IL and rising output voltage Vo.

When the inductor current IL is lower than the estimated load current Ith (step 27) and the output voltage Vo is higher than the lower bound VL (of the steady state window) (step 28), the boost converter 100 exits the light-to-heavy load transient mode (to enter steady mode), otherwise the flow goes back to step 23.

According to the embodiment as described above, it is noted that the transient voltage threshold Vth is dynamically determined (by the controller 13), instead of being looked up from a lookup table that stores fixed values (as adopted by Peretz et al.). Therefore, unwanted oscillation can be prevented by the embodiment.

Figure 3A:
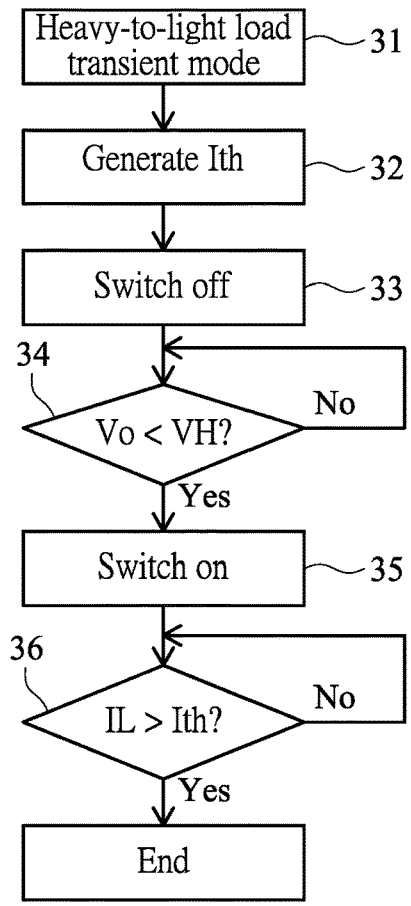
FIG. 3A shows a flow diagram illustrating a heavy-to-light load transient mode of the boost converter according to one embodiment of the present invention.
Figure 3B:
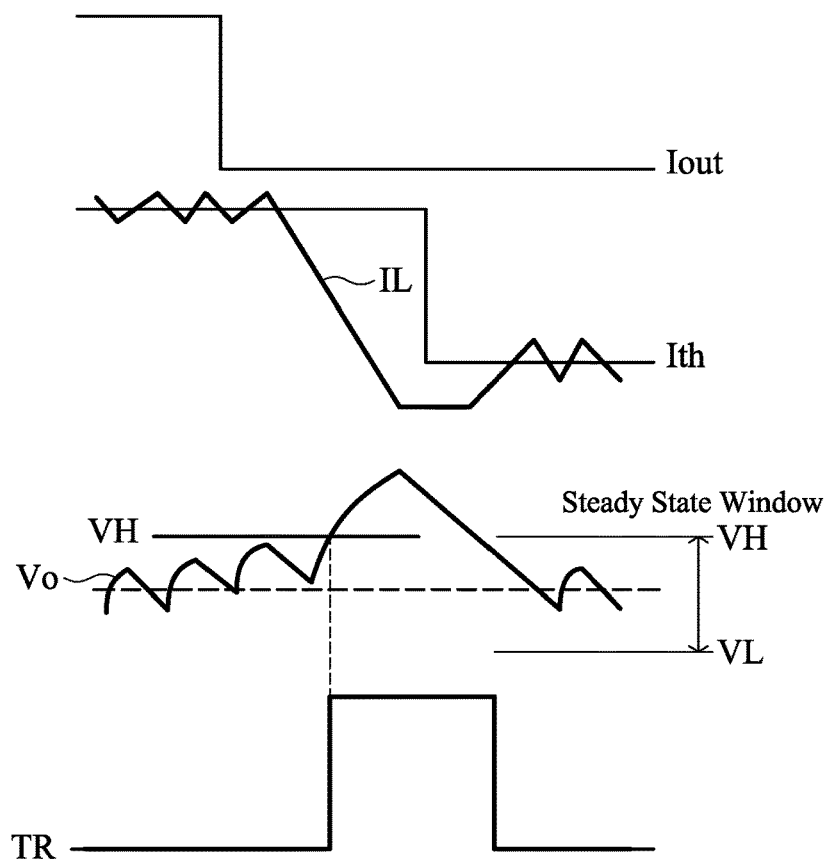
FIG. 3B shows exemplary waveforms of pertinent signals in the heavy-to-light load transient mode.

FIG. 3A shows a flow diagram illustrating a heavy-to-light load transient mode of the boost converter 100 according to one embodiment of the present invention, and FIG. 3B shows exemplary waveforms of pertinent signals in the heavy-to-light load transient mode.

Specifically, the boost converter 100 enters the heavy-to-light load transient mode (step 31) when the output voltage Vo is higher than the upper bound VH (of the steady state window) as detected by the transient detector 11. In step 32, the current estimator 12 generates an estimated (steady) load current Ith according to change in the output voltage Vo. Next, in step 33, the controller 13 fully switches off the transistor M.

When the output voltage Vo is lower than the upper bound VH (of the steady state window) (step 34), the controller 13 fully switches on the transistor M (step 35).

When the inductor current IL is higher than the estimated load current Ith (step 36), the boost converter 100 exits the heavy-to-light load transient mode.

Figure 4:
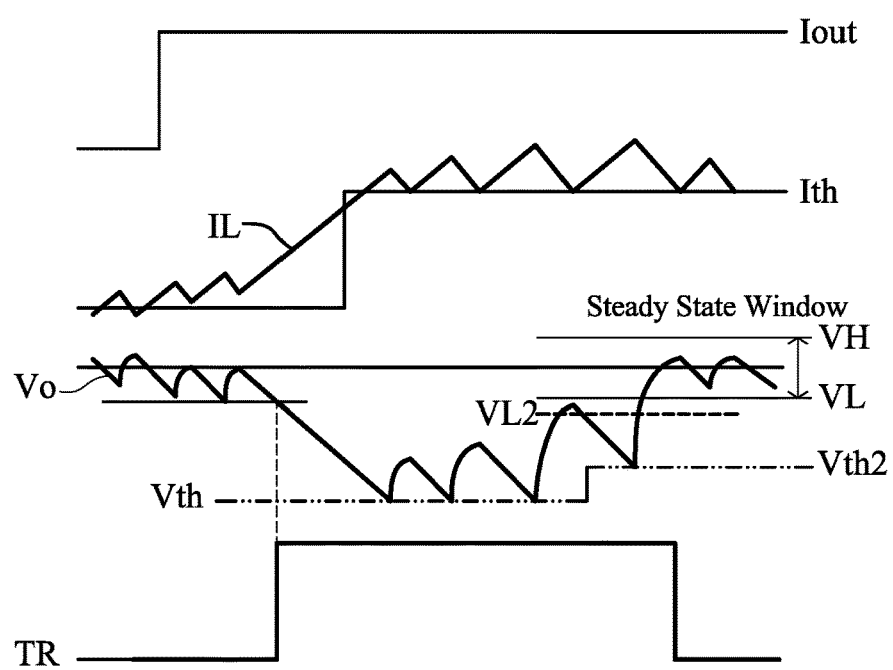
FIG. 4 shows exemplary waveforms of pertinent signals in the light-to-heavy load transient mode of the boost converter according to another embodiment of the present invention.

FIG. 4 shows exemplary waveforms of pertinent signals in the light-to-heavy load transient mode of the boost converter 100 according to another embodiment of the present invention. In the embodiment, the transient voltage threshold Vth may be either dynamically determined or obtained by looking up a lookup table.

As shown in FIG. 4, when the actual load current Iout rises abruptly, the output voltage Vo falls gradually. When the output voltage Vo is lower than the lower bound VL, the light-to-heavy load transient mode is thus detected by the transient detector 11. Subsequently, the current estimator 12 may generate the estimated load current Ith according to change in the output voltage Vo.

According one aspect of the embodiment, the steady state window further has an extended lower bound VL2, which is lower than the lower bound VL with a predetermined difference therebetween. The boost converter 100 of the embodiment performs the light-to-heavy load transient mode in a manner similar to the flow of FIG. 2A with the following exceptions.

In step 28, if the output voltage Vo lower than the lower bound VL but higher than the extended lower bound VL2, the transient voltage threshold Vth is replaced with an adaptive transient voltage threshold Vth2, which is higher than the transient voltage threshold Vth with a predetermined difference therebetween.

As illustrated in FIG. 4, it is noted that, in the light-to-heavy load transient mode, the output voltage Vo has at least one first valley point with a value of the transient voltage threshold Vth, followed by at least one second valley point with a value of the adaptive transient voltage threshold Vth2 (which is higher than the first valley point), before the boost converter 100 enters the steady mode. It is further noted that, in the embodiment, a difference between the second valley point and the transient voltage threshold Vth (i.e., the first valley point) should be less than a height of the steady state window (i.e., VH−VL).

Figure 5:
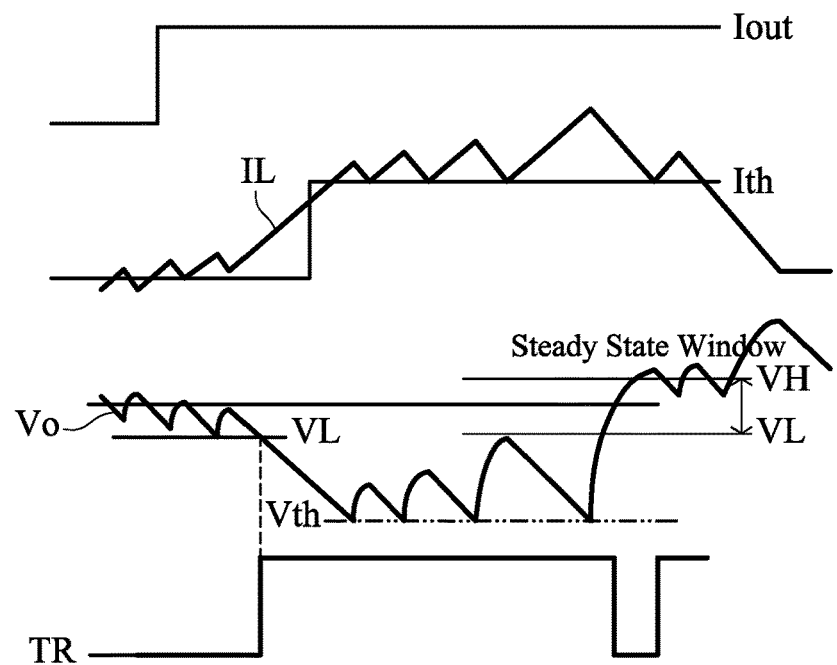
FIG. 5 shows exemplary waveforms of pertinent signals in the light-to-heavy load transient mode of the boost converter without adopting the extended lower bound and the adaptive transient voltage threshold.

FIG. 5 shows exemplary waveforms of pertinent signals in the light-to-heavy load transient mode of the boost converter 100 without adopting the extended lower bound VL2 and the adaptive transient voltage threshold Vth2. As demonstrated in FIG. 5, the output voltage Vo in the light-to-heavy load transient mode may probably exceed the upper bound VH of the steady state window, and trigger a heavy-to-light load transient mode, thereby slowing down the transient response. Therefore, the present embodiment adopting the extended lower bound VL2 and the adaptive transient voltage threshold Vth2 can further speed up the light-to-heavy load transient.

Figure 6:
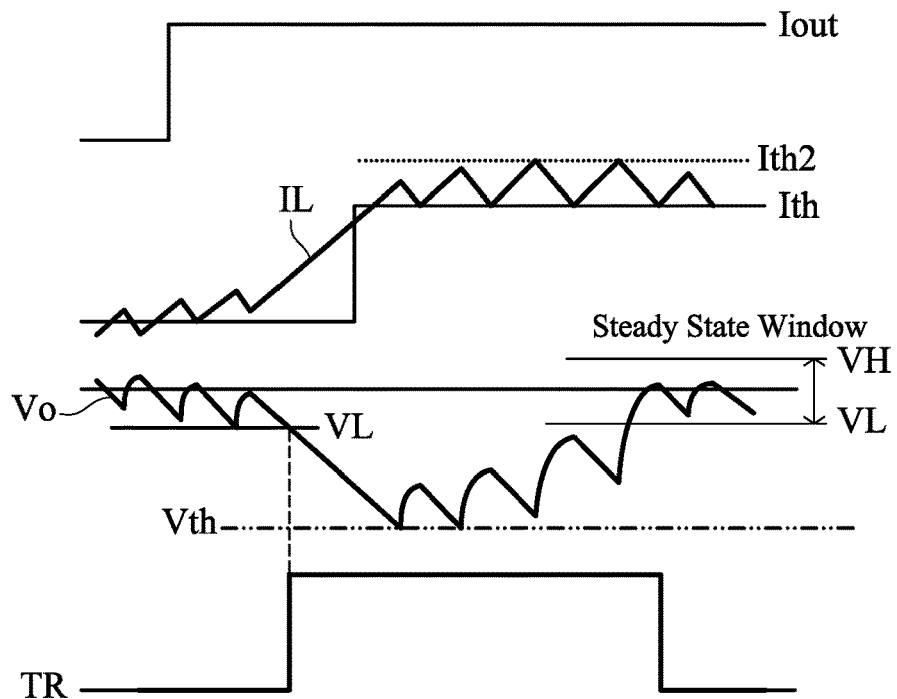
FIG. 6 shows exemplary waveforms of pertinent signals in the light-to-heavy load transient mode of the boost converter according to a further embodiment of the present invention.

FIG. 6 shows exemplary waveforms of pertinent signals in the light-to-heavy load transient mode of the boost converter 100 according to a further embodiment of the present invention. In the embodiment, the transient voltage threshold Vth may be either dynamically determined or obtained by looking up a lookup table. The boost converter 100 of the embodiment performs the light-to-heavy load transient mode in a manner similar to the flow of FIG. 2A with the following exceptions.

According to one aspect of the embodiment, the current estimator 12 may provide an adaptive load current Ith2, which is higher than the estimated load current Ith with a predetermined difference therebetween. In one embodiment, the adaptive load current Ith2 may be obtained (for example, by looking up a lookup table) according to the lower bound VL and the transient voltage threshold Vth.

In step 25, in addition to the comparison between the output voltage Vo and the transient voltage threshold Vth, if the inductor current IL is higher than the adaptive load current Ith2, the controller 13 fully switches off the transistor M (step 26), thereby resulting in falling inductor current IL and rising output voltage Vo.

As illustrated in FIG. 6, it is noted that, in the light-to-heavy load transient mode, the output voltage Vo has at least one first valley point with a value of the transient voltage threshold Vth, followed by at least one second valley point with a value higher than the first valley point, before the boost converter 100 enters the steady mode. It is further noted that, in the embodiment, a difference between the second valley point and the transient voltage threshold Vth (i.e., the first valley point) should be less than a height of the steady state window (i.e., VH−VL).

The present embodiment adopting the adaptive load current Ith2 can further speed up the light-to-heavy load transient. It is appreciated that, without adopting the adaptive load current Ith2, the output voltage Vo in the light-to-heavy load transient mode may probably exceed the upper bound VH of the steady state window, and trigger a heavy-to-light load transient mode, thereby slowing down the transient response, as illustrated in FIG. 5.

Although specific embodiments have been illustrated and described, it will be appreciated by those skilled in the art that various modifications may be made without departing from the scope of the present invention, which is intended to be limited solely by the appended claims.

What is claimed is:

1. A boost converter, comprising:
an inductor and a diode electrically connected in series between an input voltage and an output voltage;
a transistor electrically coupled to an interconnected node of the inductor and the diode; and
a controller that controls switching of the transistor according to a transient mode and an estimated load current;
wherein the output voltage in a light-to-heavy load transient mode has at least one first valley point with a value of a transient voltage threshold, followed by at least one second valley point with a value higher than the first valley point, before exiting the light-to-heavy load transient mode;
wherein the output voltage is recorded as the transient voltage threshold after a predetermined time lapses when an inductor current is greater than the estimated load current.

2. The boost converter of claim 1, further comprising:
a capacitor electrically connected between the output voltage and ground.

3. The boost converter of claim 1, further comprising:
a transient detector that detects the transient mode by comparing the output voltage with a steady state window bounded by an upper bound and a lower bound.

4. The boost converter of claim 3, further comprising:
a current estimator that generates the estimated load current according to change in the output voltage.

5. The boost converter of claim 4, wherein the estimated load current is generated according to a slope of the output voltage in a beginning period of the light-to-heavy load transient mode.

6. The boost converter of claim 3, wherein the controller performs the following steps in the light-to-heavy load transient mode:
(a) switching on the transistor when the light-to-heavy load transient mode is detected;
(b) switching off the transistor when the inductor current is greater than the estimated load current and the output voltage is lower than the transient voltage threshold; and
(c) exiting the light-to-heavy load transient mode when the inductor current is lower than the estimated load current and the output voltage is higher than the lower bound, otherwise switching on the transistor and going back to step (b).

7. The boost converter of claim 3, wherein an extended lower bound is provided that is lower than the lower bound with a predetermined difference therebetween, and the transient voltage threshold is replaced with an adaptive transient voltage threshold if the output voltage is lower than the lower bound but higher than the extended lower bound, which is higher than the transient voltage threshold with a predetermined difference therebetween.

8. The boost converter of claim 7, wherein the second valley point has a value of the adaptive transient voltage threshold.

9. The boost converter of claim 3, wherein an adaptive load current is provided that is higher than the estimated load current with a predetermined difference therebetween, and the controller switches off the transistor if the inductor current is higher than the adaptive load current.

10. The boost converter of claim 9, wherein the adaptive load current is obtained according to the lower bound and the transient voltage threshold.

11. The boost converter of claim 9, wherein a difference between the second valley point and the transient voltage threshold is less than a height of the steady state window.

* * * * *